UNITED STATES PATENT OFFICE.

CHARLES GOODYEAR, OF NEW HAVEN, CONNECTICUT. EXECUTOR OF CHAS. GOODYEAR, DECEASED.

IMPROVEMENT IN THE MANUFACTURE OF CAOUTCHOUC.

Specification forming part of Letters Patent No. 3,633, dated June 15, 1844; extended seven years: Reissue No. 156, dated December 25, 1849; Reissue No. 1,084, dated November 20, 1860.

*To all whom it may concern:*

Be it known that CHARLES GOODYEAR, late of the city of New Haven, in the State of Connecticut, did invent a certain new and useful Manufacture of Caoutchouc or India-Rubber, not known or used by others before his invention or discovery; and I do hereby declare that the following is a full, clear, and exact description of the principle or character which distinguishes it from all other things known before.

Caoutchouc or india-rubber in its native state possesses in a high degree the valuable quality of elasticity, and the capacity to resist the penetrating power of water; but its sensibility to the dissolving power of heat, the hardening power of cold, and its loss of permanent elasticity under pressure or tension diminished its practical utility in the arts. CHARLES GOODYEAR succeeded in producing a new manufacture, substance, or product in which all the properties and qualities of native caoutchouc or india-rubber are vastly improved and all the natural defects of that material are remedied, so that the new manufacture or substance is water-proof, permanently and highly elastic under all conditions of its use, and at the same time insensible to the effects of any fluctuation in temperature to which in common use the articles made of the new manufacture are likely to be subjected, as well as in some measure to the destructive effects of many of the essential oils and acids.

The following description of a process by which the new manufacture or substance may be produced will enable persons skilled in the art to produce it.

Twenty-five parts, by weight, of native caoutchouc or india-rubber, and five parts of sulphur may be combined or mixed, either by grinding them together in a machine well known to the trade for that purpose, or by dissolving the rubber in any of its known solvents, and adding the sulphur in a powdered form, and then drying the mixture so as to evaporate the solvent. The composition thus made of india-rubber and sulphur must then be subjected to the action of a high degree of heat—say from 212° to 350° Fahrenheit—which may be applied in a variety of ways, one of which is by the use of an oven capable of being heated up gradually to the desired temperature—270° of Fahrenheit being about the best. It is found in practice that the desired result will be produced by exposing the material to the heat for a length of time varying according to the temperature and the thickness of the mass to be cured. An exposure to the heat of from two to six hours is generally found sufficient. The result of this process thus applied will be a new manufacture, substance, or product somewhat similar in general appearance to native india-rubber, but having qualities or properties possessed by no other known substance or material, and of very great value in the arts.

For many purposes the manufacture is improved by the addition of other substances than sulphur, among which white lead is one of the best, and which, when used, may be combined in the mixture above described in the proportion of seven parts, by weight, thereby forming a triple compound. Other salts of lead may be used with advantage, and coloring-matter may be also incorporated with the mixture for the purpose of imparting colors to the product; and other materials—such as cotton, silk, wool, or leather—may be incorporated or combined with the india-rubber and sulphur, thereby modifying the strength, elasticity, or other qualities of the new manufacture for particular purposes, as it is found that the new substance or product will be produced whenever the essential elements of rubber, sulphur, and heat are used, whether such other materials are incorporated or not.

In subjecting the india-rubber to heat for the purposes described, sulphur may be used or incorporated with or applied to the caoutchouc in a variety of ways, either in a gaseous, liquid, or solid form; but its presence in some form at sometime during the application of the heat is essential to the production of the new manufacture which CHARLES GOODYEAR invented, although it is found that the effect will be produced by the use of very small quantities of sulphur. In practice, however, for most purposes the proportion mentioned in this description will be found sufficiently accurate for good results. Before subjecting the mixture to the action of heat it is obvious that it may be molded into such shape as may be needed, and in that shape converted into the new manufacture or substance called "vulcanized india-rubber."

What is claimed as the invention of CHARLES GOODYEAR, deceased, is—

The new manufacture called "vulcanized india-rubber," which is a combination of india-rubber with sulphur, (whether with or without other ingredients,) chemically altered by the application of heat, substantially as described.

CHAS. GOODYEAR.

In presence of—
EDW. N. DICKERSON,
JAMES A. DORR.